United States Patent Office 3,511,032
Patented May 12, 1970

3,511,032
HARVESTING PROCESS
Kenneth A. Demuth, Burkettville, Maine 04540
Continuation-in-part of application Ser. No. 691,515, Dec. 18, 1967. This application Apr. 16, 1968, Ser. No. 725,571
Int. Cl. A01g 19/00; A01d 11/00
U.S. Cl. 56—1                    4 Claims

ABSTRACT OF THE DISCLOSURE

A process for harvesting is described wherein a weather-resistant net is placed on a growing area at the beginning of a growth cycle. The mesh of the net is chosen to be slightly larger than the normal stem diameter. Accordingly, stems grow through the net and bear fruit. Lifting the net strips the fruit from the stems to provide a rapid inexpensive method of harvesting. The process is particularly useful for rhizome plants, such as blueberries, but can also be used for weak root system plants such as tomatoes by placing a holding net below the weather-resistant net.

Cross-reference to related application

This application is a continuation-in-part of co-pending application 691,515 filed Dec. 18, 1967 (now abandoned) and entitled "Blueberry Harvesting Process."

Background of invention

This invention relates to harvesting. It is particularly directed to a rhizome type of vegetative propagation such as low-bush blueberries and cranberries but is also applicable to non-rhizome and weak root plants such as tomatoes.

Low-bush blueberries were formerly a wild growth but are now essentially a farm crop. In a well developed field, growth occurs primarily by the spreading of the rhizome a couple of inches below the soil surface with the formation of buds which form new stems. During the first spring and summer the new stems grow but do not fruit. During the second spring and summer the stems flower and fruit. The following spring and summer will also provide flowering and fruiting. It has, however, been a customary practice to burn over the land after harvesting after the first or second crop. The more common cycle is now a two year cycle so that each biennial harvest is the result of new stem growth. It should also be noted that fertilizing and wed removal are important aspects in the care of low-bush blueberries.

Low-bush berries such as blueberries are difficult to harvest. The traditional tool, the blueberry rake, requires time, skill and care and is entirely a hand operation. Even with time and skill, a significant proportion of the blueberries harvested are wet, soggy or crushed. Although mechanical means are available to remove leaves and mashed and green berries from a mass of harvested blueberries, mechanical harvesting has been generally unsuitable.

Summary of invention

The invention relates broadly to a method for harvesting fruit and similar products from plants by placing a weather-resistant net on a growing area at the beginning of a growth cycle. The mesh of the net is large enough for the stems to grow through but small enough to retain the fruit. Harvesting is accomplished by raising the net so as to strip and gather the fruit in the net.

In particular the invention comprises a cycle method for growing and harvesting low-bush berries such as blueberries on soil in which there is already an established rhizome. The cycle comprises preparing such soil in late fall or early spring by burning or a similar pruning method to remove all growth above the ground. After this has been accomplished, a net is laid on the ground, the net having openings which are sufficiently large to permit the growth of a stem therethrough. The net is flexible and made of weather resistant material such as nylon or polypropylene, or metal. The size of the net can vary as will be evident below.

The net is held on the ground in a fixed position. During the first spring and summer the blueberry rhizomes produce stems which grow through the openings in the net. There is also commonly weed growth through the net. Fertilizer may or may not be applied as would normally be done for the first year of new blueberry stem growth. Before the frost sets in, the weeds are removed to as great an extent as possible, usually by a mower whose height of cut is set just above the height of the blueberry stems.

During the spring and summer of the following year the blueberry stems that have grown through the net now flower and fruit. When the berries are ready for harvesting, the net is then raised either by hand or by mechanical means, which action strips the berries from the stems with a minimum of crushing and provides within the net a mass of harvested blueberries with only a minimum of leaves and stems. The latter can be removed by conventional winnowing methods after the mass has been transferred from the net.

The size of the nets used on a field can be varied according to the uniformity of expected harvest time or the labor available. A typical net could be a square ten foot on each side with mesh in the order of magnitude of ¼ to ½ inch. The burning process can be done by first applying a layer of hay and igniting or by use of an oil or gas burner without using hay. After a harvest has been accomplished, the growth can be moved and the burning delayed until just before the frost or in the early spring.

I have found that by means of this invention that I can save many hours of time and much expense in the harvesting of blueberries.

In addition to rhizome plants such as blueberries and cranberries, this invention is applicable to non-rhizome and weak root system plants, such as tomatoes, by placing a holding net below the weather-resistant net. The holding net is preferably made of a coarse natural material, such as hemp or burlap, which will decay or disintegrate after the harvest. The mesh of the holding net also permits stem growth through it. In such a case the cleared and prepared soil is seeded, then the holding net and weather resistant nets laid down. However, seeding or planting may also be done after the nets are laid.

Invention as applied to blueberries

Figure 1:
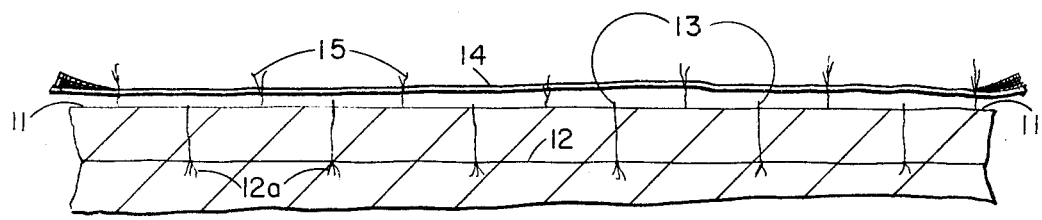
FIG. 1 is a schematic vertical section showing the stripping net in position after the ground has been burned or pruned.
Figure 2:
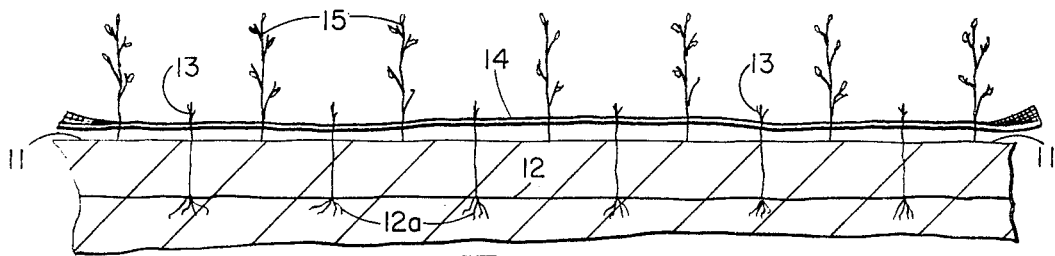
FIG. 2 is a similar view showing blueberry stem growth through the net during the first spring and summer.
Figure 3:
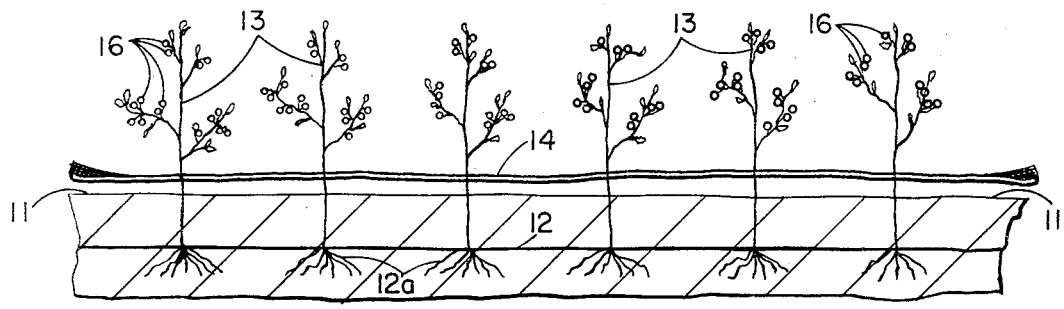
FIG. 3 is a similar view after the weeds have been removed and after the blueberries have formed during the second season.
Figure 4:
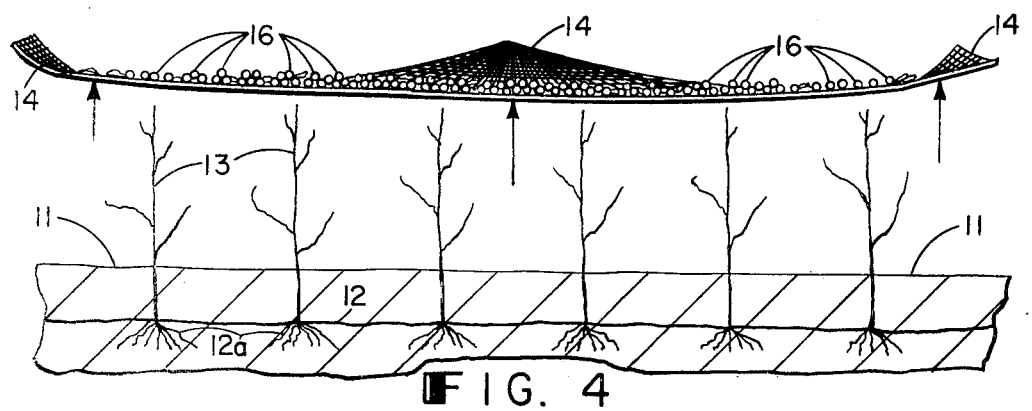
FIG. 4 is a similar view showing the raising of the net to strip the blueberries.

Referring now to the drawings, the soil has a previously established blueberry rhizome 12 with its root hairs 12a, the rhizome being generally shallow, about two inches or so below the top surface 11 of the soil. After the previous growth has been burned away or otherwise pruned, a polypropylene net 14 having a mesh of ⅜ inch and being a square of about six feet on each side is laid on the surface 11 and fastened with stakes at each corner.

During the first spring and summer, there are growth of new stems 13 from the rhizome 12 as well as weed growth 15. The weed growth is removed by mowing so that during the second spring and summer there is very little present. During the second summer the blueberries 16 form on the stems 13. When they are ready for harvesting the net 14 is raised, stripping the blueberries together with some pieces of stem and leaves. This mass is then transferred to another container or machine where the leaves and stems are removed by winnowing.

Scope of invention

Although this invention is particularly useful in harvesting plants whose crop is a fruit, such as blueberries, cranberries and tomatoes, it is applicable broadly to plant life generally, whether grown on land or in water or in the sea, wherein there are stems or supports bearing crop elements.

I claim:
1. A process for growing and harvesting a crop from a plant comprising:
   (a) applying a weather resistant net to a growing area at the beginning of a growth cycle, the mesh of said net being slightly larger than a stem or support but smaller than the elements of the crop;
   (b) allowing the stems or supports to grow through the net and yield the crop;
   (c) raising the net when the crop is substantially complete, thus stripping and collecting the crop in the net;
   (d) removing the crop from the net.
2. The process of claim 1 wherein the plant is bush type and the crop is a fruit.
3. The process of claim 2 wherein the plant has an established rhizome.
4. The process of claim 2 wherein the plant is a lowbush blueberry with an established rhizome in a growing area which has been previously burned or pruned and which includes removing before the frost any weeds that may have grown during the first spring and summer.

References Cited
UNITED STATES PATENTS

| | | | |
|---|---|---|---|
| 2,605,589 | 8/1952 | Kuestner | 47—56 |
| 2,916,854 | 12/1959 | Heigl et al. | 47—58 |
| 3,111,799 | 11/963 | Schmit et al. | 56—1 |

ROBERT E. BAGWILL, Primary Examiner

U.S. Cl. X.R.

47—58; 56—330